US012670642B2

(12) United States Patent
Wu et al.

(10) Patent No.: US 12,670,642 B2
(45) Date of Patent: Jun. 30, 2026

(54) METHOD, APPARATUS, DEVICE AND STORAGE MEDIUM FOR VIDEO RECORDING

(71) Applicant: Beijing Bytedance Network Technology Co., Ltd., Beijing (CN)

(72) Inventors: Ziyang Wu, Beijing (CN); Lu Tao, Beijing (CN); Yixing Zhu, Beijing (CN); Yi Wang, Singapore (SG); Songda Li, Beijing (CN); Suiyu Feng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 154 days.

(21) Appl. No.: 18/697,431

(22) PCT Filed: Sep. 14, 2022

(86) PCT No.: PCT/CN2022/118698
§ 371 (c)(1),
(2) Date: Mar. 29, 2024

(87) PCT Pub. No.: WO2023/051246
PCT Pub. Date: Apr. 6, 2023

(65) Prior Publication Data
US 2024/0404548 A1      Dec. 5, 2024

(30) Foreign Application Priority Data

Sep. 30, 2021      (CN) ........................... 202111165277.6

(51) Int. Cl.
*G10L 25/51* (2013.01)
*G06T 11/60* (2006.01)
*G10L 15/02* (2006.01)

(52) U.S. Cl.
CPC .............. *G10L 25/51* (2013.01); *G06T 11/60* (2013.01); *G10L 15/02* (2013.01)

(58) Field of Classification Search
CPC ........ G06F 16/433; G06F 16/638; G06F 3/16; G06F 16/683; G06T 7/33; G06T 7/70;
(Continued)

(56) References Cited

U.S. PATENT DOCUMENTS 5,099,337 A * 3/1992 Cury ...................... H04N 5/765
386/230
6,072,933 A * 6/2000 Green .................. G11B 27/028
386/E5.069
(Continued)

FOREIGN PATENT DOCUMENTS

CN        1601600 A      3/2005
CN      102543136 A      7/2012
(Continued)

OTHER PUBLICATIONS

International Search Report and the WO received in Int'l Appl. No. PCT/CN2022/118698, mailed Oct. 27, 2022, 3 pages.
(Continued)

*Primary Examiner* — Gerald Gauthier
(74) *Attorney, Agent, or Firm* — Astute IP Law Group

(57) ABSTRACT

Example embodiments of the present disclosure relates to a method, apparatus, device and storage medium for video recording. The method comprises: collecting voice data and an image of a target user; determining a match degree between the voice data and a reference audio; determining a target effect based on the match degree; adding the target effect to the collected image to obtain a target image; encoding the voice data and the target image to obtain a target video.

17 Claims, 2 Drawing Sheets

(58) Field of Classification Search
CPC .... G06T 11/60; G06V 10/806; G10H 1/0008; G10H 1/363; G10H 1/368; G10H 2220/005; G10H 2220/455; G10L 15/02; G10L 25/48; G10L 25/51; G10L 25/57; G10L 19/008; G11B 27/028; G11B 27/031; G11B 20/10527; G11B 27/11; H04N 5/602; H04N 5/772; H04N 5/76; H04N 5/765; H04N 9/8211; H04N 19/42; H04N 21/4312; H04N 21/4394; H04N 21/4788; H04N 5/067; H04N 21/4112; H04R 3/12; H04S 3/008; H04S 7/303; A63F 13/42
See application file for complete search history.

(56) References Cited

U.S. PATENT DOCUMENTS

| | | | | |
|---|---|---|---|---|
| 7,203,557 | B1* | 4/2007 | Thompson | H04S 3/008 704/E21.02 |
| 8,774,953 | B2* | 7/2014 | Yuasa | H04N 5/602 84/673 |
| 8,849,432 | B2* | 9/2014 | Moorer | H04N 21/4394 700/94 |
| 8,879,761 | B2* | 11/2014 | Johnson | H04R 3/12 381/306 |
| 8,903,524 | B2* | 12/2014 | Cafarella | G10L 25/48 381/56 |
| 2004/0049305 | A1* | 3/2004 | Takahashi | H04N 5/067 381/106 |
| 2008/0140424 | A1* | 6/2008 | Kim | H04N 5/772 704/278 |
| 2008/0307948 | A1* | 12/2008 | Minarik | G10H 1/368 84/612 |
| 2009/0314155 | A1 | 12/2009 | Qian et al. | |
| 2010/0008641 | A1* | 1/2010 | Murabayashi | H04N 9/8211 382/118 |
| 2011/0046761 | A1* | 2/2011 | Titchener | G11B 20/10527 700/94 |
| 2011/0230987 | A1* | 9/2011 | Anguera | G11B 27/031 700/94 |
| 2012/0017150 | A1* | 1/2012 | Pollack | H04N 5/76 386/280 |
| 2012/0067196 | A1* | 3/2012 | Rao | G10H 1/363 84/611 |
| 2012/0185072 | A1* | 7/2012 | Millington | G06F 16/638 700/94 |
| 2013/0046399 | A1* | 2/2013 | Lu | G06F 16/683 700/94 |
| 2013/0218315 | A1* | 8/2013 | Jaeger | G06F 3/16 700/94 |
| 2013/0226324 | A1* | 8/2013 | Hannuksela | G06F 3/16 700/94 |
| 2013/0246077 | A1* | 9/2013 | Riedmiller | G10L 19/008 704/500 |
| 2015/0301788 | A1* | 10/2015 | Johnston | H04N 21/4112 700/94 |
| 2016/0078853 | A1* | 3/2016 | Gonczi | A63F 13/42 700/91 |
| 2016/0267921 | A1* | 9/2016 | Dang | G06F 16/433 |
| 2018/0249200 | A1* | 8/2018 | Wang | H04N 21/4788 |
| 2019/0172456 | A1* | 6/2019 | Lee | G06T 7/70 |
| 2021/0193184 | A1* | 6/2021 | Yuan | G06V 10/806 |
| 2021/0334595 | A1* | 10/2021 | Berlin | G06T 7/32 |
| 2023/0088467 | A1* | 3/2023 | Liu | H04S 7/303 700/94 |
| 2023/0297324 | A1* | 9/2023 | Yu | H04R 3/12 700/94 |
| 2024/0404548 | A1* | 12/2024 | Wu | G10H 1/0008 |

FOREIGN PATENT DOCUMENTS

| | | |
|---|---|---|
| CN | 102968409 A | 3/2013 |
| CN | 105094807 A | 11/2015 |
| CN | 108259983 A | 7/2018 |
| CN | 108848394 A | 11/2018 |
| CN | 104581348 A | 12/2018 |
| CN | 108965757 A | 12/2018 |
| CN | 112380379 A | 2/2021 |
| CN | 113923390 A | 1/2022 |

OTHER PUBLICATIONS

Office Action received in CN Application No. 2021111652776, mailed Nov. 18, 2022, 8 pages.

* cited by examiner

COLLECT VOICE DATA AND AN IMAGE OF A TARGET USER — S110

DETERMINE A MATCH DEGREE BETWEEN THE VOICE DATA AND A REFERENCE AUDIO — S120

DETERMINE A TARGET SPECIAL EFFECT BASED ON THE MATCH DEGREE — S130

ADD THE TARGET SPECIAL EFFECT TO THE COLLECTED IMAGE TO OBTAIN A TARGET IMAGE — S140

ENCODE THE VOICE DATA AND THE TARGET IMAGE TO OBTAIN A TARGET VIDEO — S150

METHOD, APPARATUS, DEVICE AND STORAGE MEDIUM FOR VIDEO RECORDING

This is a national stage application based on International Patent Application No. PCT/CN2022/118698, filed Sep. 14, 2022, which claims priority to CN patent application No. 202111165277.6 filed on Sep. 30, 2021, entitled "METHOD, APPARATUS, DEVICE AND STORAGE MEDIUM FOR VIDEO RECORDING", the disclosures of which are hereby incorporated by reference in their entireties.

FIELD

Example embodiments of the present disclosure relates generally to the field of internet technologies, and for example, to a method, apparatus, device and storage medium for video recording.

BACKGROUND

With the development of internet technologies, many video applications support the recording of songs. During the process of singing a song, the video application can record the user and share the recorded video to a network platform of the video application through the network.

In the related art, the manner in which the terminal device records audio data and images of the user singing a target song via the video application is relatively monotonous, and the user experience is rather poor.

SUMMARY

Embodiments of the present disclosure provide a method, apparatus, device and storage medium for video recording so as to achieve the recording of audio data and images when a user sings a song, which can enhance the interest of recorded video and improve the user experience.

In a first aspect of the present disclosure, a method for video recording is provided. The method comprises:

collecting voice data and an image of a target user;

determining a match degree between the voice data and a reference audio;

determining a target effect based on the match degree;

adding the target effect to the collected image to obtain a target image;

encoding the voice data and the target image to obtain a video.

In a second aspect of the present disclosure, an apparatus for video recording is provided. The apparatus comprises:

a collection module, configured for collecting voice data and an image of a target user;

a match degree determining module, configured for determining a match degree between the voice data and a reference audio;

a target effect determining module, configured for determining a target effect based on the match degree;

a target image obtaining module, configured for adding the target effect to the collected image to obtain a target image;

a target video obtaining module, configured for encoding the voice data and the target image to obtain a video.

In a third aspect of the present disclosure, an electronic device is provided. The device comprises:

one or more processing device;

storage means, configured for storing one or more programs;

the one or more programs, when executed by the one or more processing device, causing the one or more processing device to perform a method for video recording according to the first aspect.

In a fourth aspect of the present disclosure, a computer-readable medium is provided. The computer-readable medium stores a computer program that can be executed by a processing device to implement the method of the first aspect.

DETAILED DESCRIPTION

It is to be understood that multiple steps described in the method implementation method of this disclosure can be executed in different orders and/or in parallel. In addition, the method implementation method can include additional steps and/or omit the steps shown. The scope of this disclosure is not limited in this regard.

The term "including" and its variations used in this article are open-ended, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

The concepts of "first" and "second" mentioned in this disclosure are only used to distinguish different devices, modules, or units, and are not used to limit the order or interdependence of the functions performed by these devices, modules, or units.

The modifications of "one" and "multiple" mentioned in this disclosure are illustrative and not restrictive. Those skilled in the art should understand that unless otherwise specified in the context, they should be understood as "one or more".

The names of the messages or information exchanged between multiple devices in this public implementation are for illustrative purposes only and are not intended to limit the scope of these messages or information.

Figure 1:
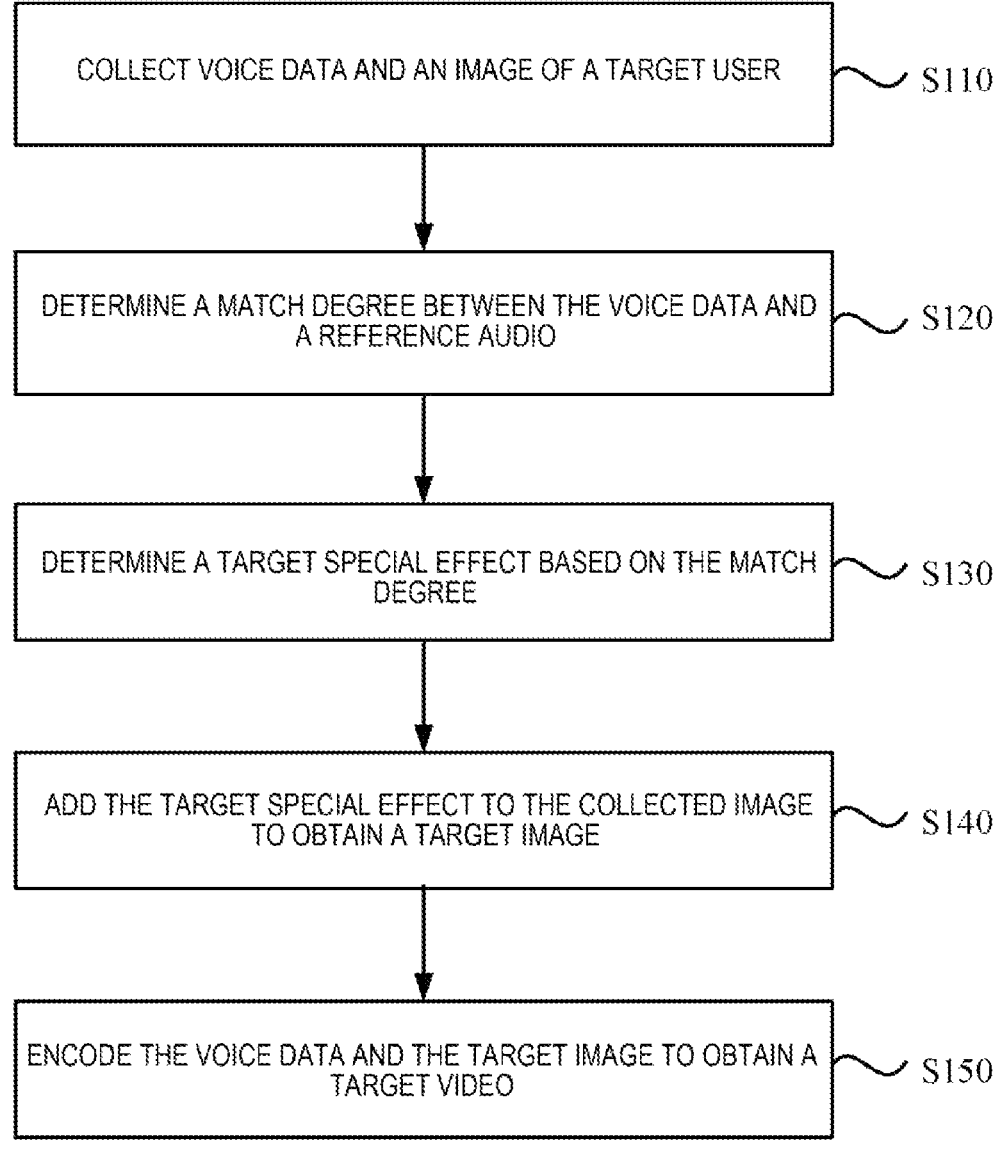
FIG. 1 shows a flowchart of a method for video recording according to some embodiments of the present disclosure.

FIG. 1 is a flowchart of a method for video recording provided by an embodiment of the present disclosure. This embodiment can be applied to the case of video recording for a user singing a song. The method can be performed by an apparatus for video recording. The apparatus can be composed of hardware and/or software, and is generally integrated in a device with video recording functionality, which can be an electronic device such as a server, a mobile terminal, or a server cluster. As shown in FIG. 1, the method comprises the following:

Step 110: collect voice data and an image of a target user.

The voice data can be speech generated by the user imitating a certain reference audio or singing a target song.

The image can be a half-length or full-length portrait (including a face) of the target user.

In this embodiment, the target user can trigger a recording instruction to cause the terminal device to collect voice data and images. The way of the target user triggering the recording instruction may be clicking on a recording button on an interface, or speech triggering or gesture triggering. In this embodiment, when the terminal device receives the recording instruction triggered by the target user, a speech collection module (e.g., a microphone) and an image collection module (e.g., camera) are controlled to start and start working so as to collect the audio data and images of the singing target user.

For example, before collecting voice data and images of the user, there is further comprised: receiving a reference audio selected by the user; segmenting the reference audio to obtain a plurality of sub-audios; sequentially playing the plurality of sub-audios according to timestamps, cause the target user to input voice by imitating the played sub-audios.

The reference audio can be a song, an audio played by a musical instrument, or animal sound, which is not limited here. The reference audio can be segmented according to a duration, for example, divided into segments every 5 seconds. Or if the reference audio contains text content, it can be divided according to the text content, that is, the text content is first divided into sentences, and the reference audio is segmented according to the text content which has been divided into sentences.

In this embodiment, after segmenting the reference audio, sub-audios are played segment by segment according to timestamps, to cause the target user to input voice by imitating the sub-audio segment by segment.

For example, if the reference audio is a song, the process of segmenting the reference audio to obtain the plurality of segments of sub-audios can be: receiving the song selected by the user; obtaining a musical instrument digital interface (MIDI) file and lyrics of the song; decomposing the lyrics to obtain a plurality of sentences of lyrics; and the process of playing the plurality of segments of sub-audios sequentially according to timestamps to cause the target user to input voice by imitating the played sub-audios can be: sequentially playing the plurality of sub-lyrics and the MIDI file according to timestamps, to cause the user to sing the target song according to melodies corresponding to the MIDI file and the played sub-lyrics.

The target song can be a song selected by the user from a song library, and the MIDI file can be understood as a file in MIDI format in music files. Playing the MIDI file according to timestamps can be understood as playing the melodies corresponding to the MIDI file sequentially according to timestamps; playing the plurality of sub-lyrics sequentially according to timestamps can be understood as presenting the plurality of sub-lyrics on the interface sequentially according to timestamps.

Step 120: determine a matching degree between the voice data and the reference audio.

The match degree may be characterized by a similarity between the voice data and the reference audio. In this embodiment, if the similarity between the voice data and the reference audio is less than a preset threshold (or a preset threshold range), the match degree is low; if the similarity between the voice data and the reference audio is greater than or equal to a preset threshold (or a preset threshold range), the match degree is high.

For example, the way of determining the match degree between the voice data and the reference audio can be: extracting a voice feature of the voice data and an audio feature of the reference audio; determining the similarity between the voice feature and the audio feature; determining the similarity as the match degree between the voice data and the reference audio.

The audio feature can be characterized by a high-pitched difference sequence. The process of extracting a voice feature of the voice data and an audio feature of the reference audio can be as follows: note-syncopating and quantizing the voice data, establishing a high-pitched difference sequence of the voice data based on the quantized notes to obtain a speech pitch difference sequence, i.e., the voice feature; obtaining a reference pitch difference sequence of the reference audio, i.e., the audio feature. Then, a plurality of distances between the speech pitch difference sequence and the reference pitch difference sequence are calculated, and the plurality of distances are synthesized to obtain the similarity between the voice feature and the audio feature.

The plurality of distances can include a pitch sequence distance, a duration sequence distance, and an overall match distance. The way of synthesizing the plurality of distances can be to calculate a weighted sum of the plurality of distances. The way of obtaining the reference pitch difference sequence can be to use a dynamic time warping (DTW) algorithm to obtain the reference pitch difference sequence from the song library.

Step 130: determine a target effect based on the match degree.

The effect can be a particular effect added to the collected image. The effect includes a reward effect and a punishment effect. When the match degree exceeds a certain value, the reward effect can be selected, and if the match degree is lower than a certain value, the punishment effect can be selected. As an example, the reward effect can be: retouching the target user, adding cute stickers, and aestheticizing scenes; the punishment effect can be: turning the user into a big head, fattening up the target user, adding kuso scenes, etc. In this embodiment, the effects can be stored in the form of effect packages (program packages). Program codes for processing the image with effects is written in the effect package, and image effects can be added by calling the effect package. Determining the target effects based on the match degree can be understood as calling the effect package corresponding to the target effects based on the match degree.

For example, the method further comprises: establishing an association between the match degree and the effect in advance. The way of determining the target effect based on the match degree can be to determine the target effect corresponding to the match degree based on the association.

For example, the way of determining the target effect based on the match degree can further be: extracting features of the target user in the collected image to obtain feature information of the target user; determining the target effect according to the feature information and the match degree.

The feature information can be information such as clothing features (such as color and style) of the user. For example, the process of determining the target effect according to the feature information and the match degree can be as follows: first, obtaining a set of effects corresponding to the feature information, and then selecting the target effect corresponding to the match degree from the set of effects.

Step 140: add the target effect to the collected image to obtain the target image.

In this embodiment, the effects may be stored in the form of effect packages (program packages), program codes for performing effect processing on the image are written in the effect package, and the image effects can be added by calling the effect package.

For example, the way of adding the effect to the collected image to obtain the target image can be: calling the effect package corresponding to the effect to perform effect processing on the collected image to obtain the target image.

The effect package is pre-developed by developers, and the effect package corresponding to the effect is called through a calling interface to realize the effect processing on the image.

For example, the process of adding the target effect to the collected image can be: adding the target effect to an image collected between a current match degree and a next match degree; or adding the target effect to a predetermined number of images collected from the current match degree.

In this embodiment, the way of calculating a match degree for the singing audio data can be: calculating a match degree every N segments of the sub-audios are imitated. Where N may be a positive integer greater than or equal to 1.

Step 150: encode the voice data and the target image to obtain a video.

For example, after obtaining the target image with added effects, the singing audio data and the target image are encoded to obtain a video.

For example, the solution of this embodiment is also applicable to the scene of a multi-person chorus. In the process of the multi-person chorus, a match degree can be calculated for each user participating in the singing, respectively, and a reward effect or a punishment effect can be added to the image based on the match. The specific process can be found in the above embodiments, which is not repeated here.

In the technical solution of the embodiments of the present disclosure, collects voice data and images of the user; determines a match degree between the voice data and a reference audio; determines a target effect based on the match degree; adds the target effect to the collected image to obtain a target image; and encodes the voice data and the target image to obtain a video. With the method for video recording provided by the embodiments of the present disclosure, the effect obtained based on the match degree is added to the collected image, which can improve the interest of video recording, enrich the presentation mode of the video and improve the user experience.

Figures 2, 3:
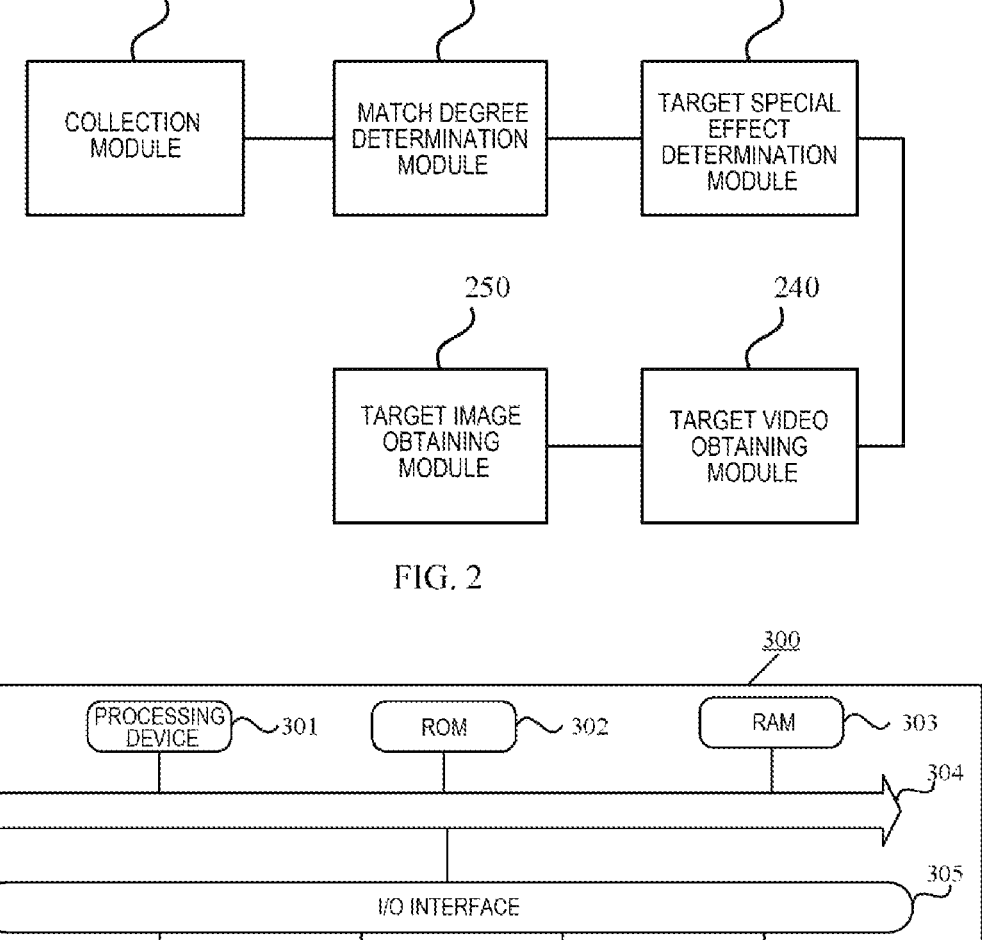
FIG. 2 shows a block diagram of an apparatus for video recording according to some embodiments of the present disclosure.
FIG. 3 shows a block diagram of an electronic device capable of implementing embodiments of the present disclosure.

FIG. 2 shows a block diagram of an apparatus for video recording according to some embodiments of the present disclosure. As shown in FIG. 2, the apparatus comprises:

a collection module 210, configured for collecting voice data and an image of a target user;

a match degree determining module 220, configured for determining a match degree between the voice data and a reference audio;

a target effect determining module 230, configured for determining a target effect based on the match degree;

a target image obtaining module 240, configured for adding the target effect to the collected image to obtain a target image;

a video obtaining module 250, configured for encoding the voice data and the target image to obtain a video.

For example, the apparatus for video recording further comprises: a reference audio playing module, configured for:

receiving a reference audio selected by the target user;

segmenting the reference audio to obtain a plurality of segments of sub-audios;

playing the plurality of segments of sub-audios sequentially according to timestamps, cause the user to input voice by imitating the played sub-audios.

For example, if the reference audio is a target song, the reference audio playing module is further configured for:

obtaining a MIDI file and lyrics of the target song;

decomposing the lyrics to obtain a plurality of sub-lyrics;

playing the plurality of sub-lyrics and the MIDI file sequentially according to timestamps, to cause the target user to sing the target song according to melodies corresponding to the played sub-lyrics and the MIDI file.

For example, the match degree determining module 220 is further configured for:

extracting a voice feature of the voice data and an audio feature of the reference audio;

determining a similarity between the voice feature and the audio feature;

determining the similarity as the match degree between the voice data and the reference audio.

For example, the apparatus for video recording further comprises: association establishment module, configured for:

pre-establishing an association between a match degree and a effect.

For example, the target effect determining module 230 is further configured for:

determining the target effect corresponding to the match degree based on the association.

For example, the target effect determining module 230 is further configured for:

extracting features of the target user in the collected image to obtain feature information of the target user;

determining the target effect based on the feature information and the match degree.

For example, the target image obtaining module 240 is further configured for:

adding the target effect to an image collected between a current match degree and a next match degree; or adding the target effect to a predetermined number of images collected from the current match degree.

For example, the target image obtaining module 240 is further configured for:

calling a effect package corresponding to the target effect to perform effect processing on the collected image to obtain the target image.

The apparatus may perform the method of the present disclosure provided in all the foregoing embodiments, the method comprises performing the corresponding functional modules and beneficial effects. Technical details not described in detail in the present embodiment, the present disclosure may refer to the method provided in all the foregoing embodiments.

Referring now to FIG. 3, which shows a schematic diagram of the structure of the electronic device 300 suitable for implementing the present disclosure embodiment. The electronic device in the present disclosure embodiment may include but is not limited to mobile phones, laptops, digital broadcast receivers, PDAs (personal digital assistants), PAD (tablet computers), PMPs (portable multimedia players), car end points (such as car navigation end points), and fixed end points such as digital TVs, desktop computers, etc., or various forms of servers, such as stand-alone servers or server clusters. The electronic device shown in FIG. 3 is only an example and should not bring any limitation on the functionality and scope of use of the present disclosure embodiment.

As shown in FIG. 3, the electronic device 300 may include a processing device (such as a Central Processor, graphics processing unit, etc.) 301, which can perform various appropriate actions and processes based on programs stored in a read-only storage device (ROM) 302 or loaded from storage device 305 into a random access storage device (RAM) 303. In RAM 303, various programs and data required for the operation of the electronic device 300 are also stored. Processing devices 301, ROM 302, and RAM 303 are connected to each other through bus 304. Input/output (I/O) interface 305 is also connected to bus 304.

Typically, the following devices can be connected to I/O interface 305: input devices 306 including touch screens, touchpads, keyboards, mice, cameras, microphones, accelerometers, gyroscopes, etc.; output devices 307 including liquid crystal displays (LCDs), speakers, vibrators, etc.; storage devices 308 including magnetic tapes, hard disks, etc.; and communication devices 309. Communication devices 309 can allow electronic devices 300 to communicate wirelessly or wirelessly with other devices to exchange data. Although FIG. 3 shows an electronic device 300 with multiple devices, it should be understood that it is not required to implement or have all of the devices shown. More or fewer devices can be implemented or provided alternatively.

According to embodiments of the present disclosure, the process described above with reference to the flowchart can be implemented as a computer software program. For example, embodiments of the present disclosure include a computer program product that includes a computer program carried on a computer-readable medium, the computer program containing program code for performing the recommended method of words. In such embodiments, the computer program can be downloaded and installed from the network through the communication device 309, or installed from the storage device 305, or from the ROM 302. When the computer program is executed by the processing device 301, the above functions defined in the method of the present disclosure are performed. The computer-readable medium can be a non-transitory computer-readable medium.

It should be noted that the computer-readable medium described above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device, or any combination thereof. More specific examples of computer-readable storage media can include but are not limited to: an electrical connection with one or more wires, a portable computer disk, a hard disk, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof. In this disclosure, a computer-readable storage medium can be any tangible medium containing or storing a program that can be used by or in conjunction with an instruction execution system, device, or device. In this disclosure, a computer-readable signal medium can include a data signal propagated in a baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, devices, or devices. The program code contained on the computer-readable medium can be transmitted using any suitable medium, including but not limited to: wires, optical cables, RF (radio frequency), etc., or any suitable combination thereof.

In some embodiments, the client and server may communicate using any currently known or future developed network protocol such as HTTP (HyperText Transfer Protocol), and may be interconnected with any form or medium of digital data communication (e.g., a communication network). Examples of communication networks include local area networks ("LANs"), wide area networks ("WANs"), the Internet (e.g., the Internet), and end-to-end networks (e.g., ad hoc end-to-end networks), as well as any currently known or future developed networks.

The computer-readable medium can be included in the electronic device, or it can exist alone and not assembled into the electronic device.

The computer-readable medium carries one or more programs, and when the one or more programs are executed by the electronic device, the electronic device: collects voice data and images of the target user; determines the match degree between the voice data and the reference audio; determines the target effect based on the match degree; adds the target effect to the collected image to obtain the target image; performs audio & video encoding on the voice data and the target image to obtain the target video.

Computer program code for performing the operations of the present disclosure may be written in one or more programming languages, or combinations thereof, including but not limited to Object Oriented programming languages such as Java, Smalltalk, C++, and also including conventional procedural programming languages such as "C" language or similar programming languages. The program code may be executed entirely on the user's computer, partially on the user's computer, as a standalone software package, partially on the user's computer, or entirely on a remote computer or server. In the case of a remote computer, the remote computer may be connected to the user's computer through any type of network, including a local area network (LAN) or a wide area network (WAN), or may be connected to an external computer (e.g., using an Internet service provider to connect via the Internet).

The flowcharts and block diagrams in the accompanying drawings illustrate the architecture, functions, and operations of systems, methods, and computer program products that may be implemented in accordance with various embodiments of the present disclosure. in this regard, each block in the flowchart or block diagram may represent a module, program segment, or portion of code that contains one or more executable instructions for implementing a specified logical function. It should also be noted that in some alternative implementations, the functions indicated in the blocks may also occur in a different order than those indicated in the figures. For example, two blocks represented in succession may actually be executed substantially in parallel, and they may sometimes be executed in reverse order, depending on the function involved. It should also be noted that each block in the block diagram and/or flowchart, and combinations of blocks in the block diagram and/or flowchart, may be implemented using a dedicated hardware-based system that performs the specified function or operation, or may be implemented using a combination of dedicated hardware and computer instructions.

Described in the present embodiment relates to the disclosed unit may be implemented by way of software, may be implemented by way of hardware, wherein the name of the unit does not constitute a limitation on the unit itself in some cases.

The functions described above herein may be performed at least in part by one or more hardware logic components. For example, without limitation, exemplary types of hardware logic components that may be used include: field programmable gate arrays (FPGAs), application specific integrated circuits (ASICs), application specific standard products (ASSPs), system-on-chip (SOCs), complex programmable logic devices (CPLDs), and the like.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. More specific examples of machine-readable storage media may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, the present disclosure discloses a method for video recording, comprising:

collecting voice data and an image of a target user;

determining a match degree between the voice data and a reference audio;

determining a target effect based on the match degree;

adding the target effect to the collected image to obtain a target image;

encoding the voice data and the target image to obtain a video.

For example, before the collecting voice data and the image of the target user, further comprising:

receiving a reference audio selected by the target user;

segmenting the reference audio to obtain a plurality of segments of sub-audios;

playing the plurality of segments of sub-audios sequentially according to timestamps, cause the user to input voice by imitating the played sub-audios.

For example, the segmenting the reference audio to obtain the plurality of segments of sub-audios if the reference audio is a target song, comprises:

obtaining a MIDI file and lyrics of the target song;

decomposing the lyrics to obtain a plurality of sub-lyrics;

the playing the plurality of segments of sub-audios sequentially according to timestamps cause the user to input voice by imitating the played sub-audios comprises:

playing the plurality of sub-lyrics and the MIDI file sequentially according to timestamps, to cause the target user to sing the target song according to melodies corresponding to the played sub-lyrics and the MIDI file.

For example, the determining the match degree between the voice data and the reference audio comprises:

extracting a voice feature of the voice data and an audio feature of the reference audio;

determining a similarity between the voice feature and the audio feature;

determining the similarity as the match degree between the voice data and the reference audio.

For example, the method further comprises:

pre-establishing an association between a match degree and an effect;

The determining a target effect based on the match degree comprising:

determining the target effect corresponding to the match degree based on the association.

For example, the determining the target effect based on the match degree comprises:

extracting features of the target user in the collected image to obtain feature information of the target user;

determining the target effect based on the feature information and the match degree.

For example, the adding the target effect to the collected image comprises:

adding the target effect to an image collected between a current match degree and a next match degree; or adding the target effect to a predetermined number of images collected from the current match degree.

For example, the adding the target effect to the collected image to obtain a target image comprises:

calling an effect package corresponding to the target effect to perform effect processing on the collected image to obtain the target image.

What is claimed is:

1. A method for video recording, comprising:

collecting voice data and an image of a user, wherein the image is a portrait of the user comprising a face of the user;

determining a match degree between the voice data and a reference audio;

determining an effect based on the match degree, wherein the effect comprises effects applied to the portrait of the user;

adding the effect to the collected image to obtain an edited image; and encoding the voice data and the edited image to obtain a video.

2. The method according to claim 1, before the collecting voice data and the image of the user, further comprising:

receiving a reference audio selected by the user;

segmenting the reference audio to obtain a plurality of segments of sub-audios;

playing the plurality of segments of sub-audios sequentially according to timestamps, to cause the user to input voice by imitating the played sub-audios to input voice.

3. The method according to claim 2, wherein the segmenting the reference audio to obtain the plurality of segments of sub-audios, in response to determining the reference audio as a song, comprises:

obtaining a MIDI file and lyrics of the song;

decomposing the lyrics to obtain a plurality of sub-lyrics;

the playing the plurality of segments of sub-audios sequentially according to timestamps to cause the user to input voice by imitating the played sub-audios comprises:

playing the plurality of sub-lyrics and the MIDI file sequentially according to timestamps, to cause the user to sing the song according to melodies corresponding to the played sub-lyrics and the MIDI file.

4. The method of claim 1, wherein the determining the match degree between the voice data and the reference audio comprises:

extracting a voice feature of the voice data and an audio feature of the reference audio;

determining a similarity between the voice feature and the audio feature;

determining the similarity as the match degree between the voice data and the reference audio.

5. The method of claim 1, further comprising:

pre-establishing an association between a match degree and an effect;

the determining an effect based on the match degree comprising:

determining the effect corresponding to the match degree based on the association.

6. The method according to claim 1, wherein the determining the effect based on the match degree comprises:

extracting features of the user in the collected image to obtain feature information of the user;

determining the effect based on the feature information and the match degree.

7. The method according to claim 1, wherein the adding the effect to the collected image comprises:

adding the effect to an image collected between a current match degree and a next match degree; or adding the effect to a predetermined number of images collected from the current match degree.

8. The method according to claim 1, wherein the adding the effect to the collected image to obtain an edited image comprises:

calling an effect package corresponding to the effect to perform effect processing on the collected image to obtain the edited image.

9. An electronic device, comprising:

one or more processing device;

storage means, configured for storing one or more programs;

the one or more programs, when executed by the one or more processing device, causing the one or more processing device to perform a method comprising:

collecting voice data and an image of a user, wherein the image is a portrait of the user comprising a face of the user;

determining a match degree between the voice data and a reference audio;

determining an effect based on the match degree, wherein the effect comprises effects applied to the portrait of the user;

adding the effect to the collected image to obtain an edited image; and encoding the voice data and the edited image to obtain a video.

10. The device of claim 9, before the collecting voice data and the image of the user, the one or more processing device is further caused to perform:

receiving a reference audio selected by the user;

segmenting the reference audio to obtain a plurality of segments of sub-audios;

playing the plurality of segments of sub-audios sequentially according to timestamps, to cause the user to input voice by imitating the played sub-audios.

11. The device according to claim 10, wherein the one or more processing device is further caused to segment the reference audio to obtain the plurality of segments of sub-audios, in response to determining the reference audio as a song, by:

obtaining a MIDI file and lyrics of the song;

decomposing the lyrics to obtain a plurality of sub-lyrics;

the playing the plurality of segments of sub-audios sequentially according to timestamps to cause the user to input voice by imitating the played sub-audios comprises:

playing the plurality of sub-lyrics and the MIDI file sequentially according to timestamps, to cause the user to sing the song according to melodies corresponding to the played sub-lyrics and the MIDI file.

12. The device according to claim 9, wherein the one or more processing device is further caused to determine the match degree between the voice data and the reference audio by:

extracting a voice feature of the voice data and an audio feature of the reference audio;

determining a similarity between the voice feature and the audio feature;

determining the similarity as the match degree between the voice data and the reference audio.

13. The device according to claim 9, wherein the one or more processing device is further caused to perform:

pre-establishing an association between a match degree and an effect;

the determining an effect based on the match degree comprising:

determining the effect corresponding to the match degree based on the association.

14. The device according to claim 9, wherein the one or more processing device is further caused to determine the effect based on the match degree by:

extracting features of the user in the collected image to obtain feature information of the user;

determining the effect based on the feature information and the match degree.

15. The device according to claim 9, wherein the one or more processing device is further caused to add the effect to the collected image by:

adding the effect to an image collected between a current match degree and a next match degree; or adding the effect to a predetermined number of images collected from the current match degree.

16. The device according to claim 9, wherein the one or more processing device is further caused to add the effect to the collected image to obtain an edited image by:

calling an effect package corresponding to the effect to perform effect processing on the collected image to obtain the edited image.

17. A non-transitory computer readable medium, having a computer program stored thereon, the computer program, when executed by processing device, performing a method comprising:

collecting voice data and an image of a user, wherein the image is a portrait of the user comprising a face of the user;

determining a match degree between the voice data and a reference audio;

determining an effect based on the match degree, wherein the effect comprises effects applied to the portrait of the user;

adding the effect to the collected image to obtain an edited image; and encoding the voice data and the edited image to obtain a video.

* * * * *